B. S. ESHELMAN.
PROCESS FOR MAKING INNER LINERS FOR TIRES.
APPLICATION FILED FEB. 13, 1909.
944,722.
Patented Dec. 28, 1909.
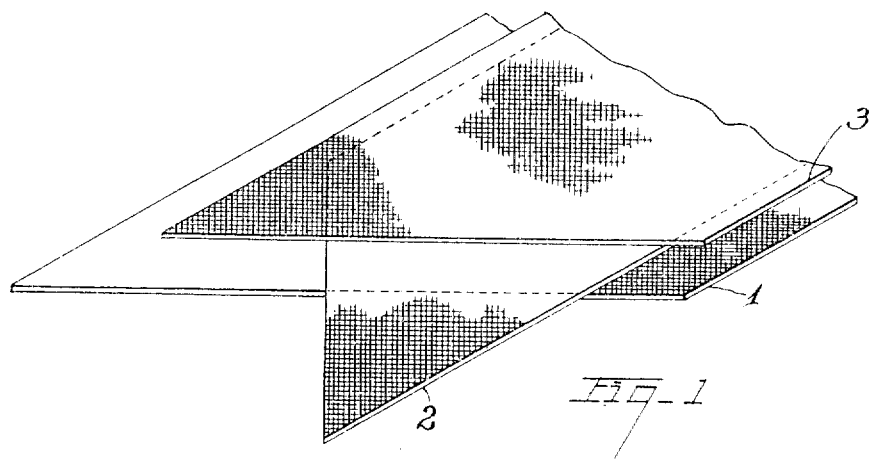
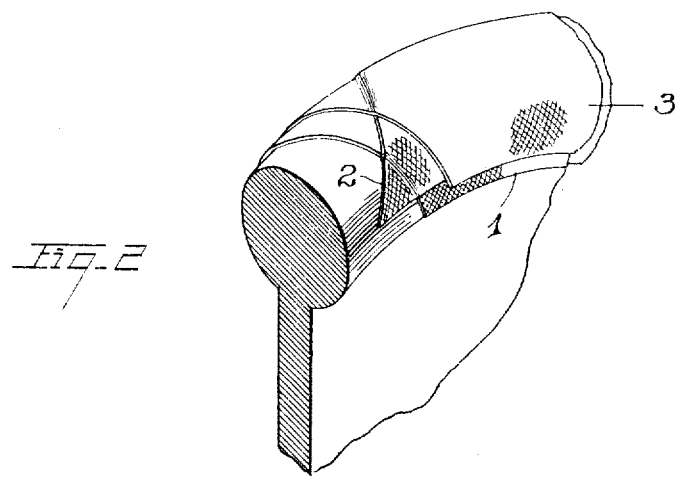
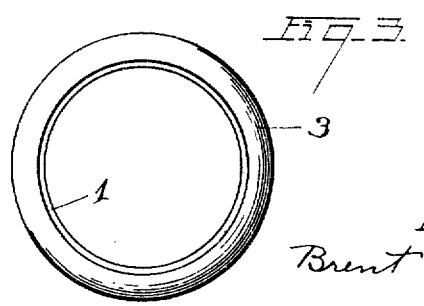
Witnesses:
Brennan B. West.
Oliver M. Kappler.
Inventor.
Brent S. Eshelman
By Bates, Fouts & Hull
Attys.

UNITED STATES PATENT OFFICE.

BRENT S. ESHELMAN, OF ASHLAND, OHIO, ASSIGNOR TO GUY V. KRICHBAUM, OF ASHLAND, OHIO.

PROCESS FOR MAKING INNER LINERS FOR TIRES.

944,722.  Specification of Letters Patent.  Patented Dec. 28, 1909.

Application filed February 13, 1909. Serial No. 477,658.

*To all whom it may concern:*

Be it known that I, BRENT S. ESHELMAN, a citizen of the United States, residing at Ashland, in the county of Ashland and State of Ohio, have invented a certain new and useful Improvement in Processes for Making Inner Liners for Tires, of which the following is a full, clear, and exact description, reference being had to the accompanying drawings.

My invention relates to a process for the manufacture of an inner liner to be used in connection with vehicle tires, the same being adapted to be placed within the outer shoe of the tire.

The process comprises the several steps set forth in the specification and mentioned in the claims.

Reference should be had to the accompanying drawings, in which—

Figure 1 is a perspective view of the several plies of material used in making the liner; Fig. 2 is a perspective view showing a portion of a form used in shaping the liner; Fig. 3 is a view of the completed liner.

It has been a problem in the tire art to secure an inner liner for tires which, while being strong and durable would at the same time give the desired and necessary flexibility, so that the liner might conform to the distortions of the tire and not be so stiff as to crack. The herein described process produces an inner liner for tires which provides durability as well as flexibility.

In the first steps in the process of manufacture, suitable strips of absorbent flexible material, such as duck, canvas, or analogous material are prepared. These strips are cut of a width suitable for the size of liner to be manufactured and of the proper length for the diameter of the tire with which they are to be used. In Fig. 1 three plies are shown associated together, but it will be evident that a greater or less number may be used if desired. The strips are cut upon a bias with respect to the direction of the threads of the material and when the strips are in assembled position, the adjacent strips have the threads or fibers extending in different directions. As shown in this figure, the lower ply 1 is quite broad, the ply 2 above ply 1 is much narrower, and ply 3 which is on top is wider than ply 2 and narrower than ply 1. These particular relative widths are chosen inasmuch as it is found that they give a very satisfactory result when made into the finished article, but it is not intended to limit the invention to the precise relative widths or particular method of assembling.

The strips when properly cut are impregnated with a rubber solution and are then placed one upon the other in their proper relative position. The next step is to subject the associated strips to suitable heat, whereby the rubber with which they have been previously impregnated becomes very soft and gummy. They are then run through a pair of rolls which exert considerable pressure and roll the strips so that they adhere very closely together and become substantially one piece. Due to the pressure, the rubber is forced into the interstices between the strands of fabric in each of the strips.

While the rubber is still in a soft and pliable condition the liner is placed upon a form, one variety of which is illustrated in Fig. 2. The form shown in Fig. 2 is simply illustrative of any desired form and where desired a mold may be used with equal facility. In this step of the process the liner is given a shape corresponding to the diameter and width of tire with which the liner is adapted to be used. When properly assembled with relation to the form, the liner and form are next placed within a steam tight oven or box and are there subjected to steam at a suitable pressure and for a suitable length of time. The liners are removed from the vulcanizing oven before they are completely cured, resulting in a liner in what is technically known as semi-cured condition. This will leave the liner in a pliable and flexible condition; however, care is taken to carry the vulcanizing sufficiently far so that the rubber is not too sticky. The liners are next coated upon their exterior surface with a rubber solution prepared for quick vulcanizing. This coat of rubber solution may be placed upon the liner immediately after being taken from the oven or at any time thereafter, as may be desirable.

The liner which results from the process above described is very tough and durable and is very flexible, which are the points desired in such articles of manufacture.

As before stated, the liner is designed to be used within the shoe of a vehicle tire. The liner, being placed within the shoe of the vehicle tire and being subjected to the heat which is generated as the tire passes over the road, when the tire is in use, will become vulcanized to the inner surface of the outer shoe, due to the fact that the outer surface of the liner is coated with a solution of rubber specially prepared with a purpose of securing quick vulcanizing. In this manner the inner liner becomes fastened to the shoe, practically becoming an integral part thereof. This does not destroy or affect the resiliency of the tire, for the reason that the inner liner is perfectly flexible and so conforms to all the distortions of the tire. This feature of flexibility is secured by the semi-curing of the liner and would not result if the liner were entirely cured, for under the heat generated in the tire, a liner which was entirely cured would become stiff and non-flexible and would shortly become disconnected from the shoe and of no value whatsoever.

The inner liner by becoming fastened to the shoe is a very efficient strengthening member for the shoe and holds the walls together even though a split or cut occur in the shoe. Furthermore, this inner liner prevents the passage of puncturing particles through the same and thereby forms a protection for the inner tube where such is used.

It is often desirable to place a layer of rubber compound upon the exterior and interior of the liner, or in fact between the various layers of the liner. In such a case, this rubber compound is applied before semi-curing. The liner is then placed under considerable pressure in any suitable manner while being subjected to heat to semi-cure the same. Such treatment as above set forth produces a liner of more finished appearance and also results in a stronger and more durable article, for the various plies are securely held together by the interposed layers of rubber.

Having thus described my invention, what I claim is:

1. The herein described process, which consists in impregnating a piece of flexible material with suitable rubber solution, semi-curing the same, and then coating the material with a solution of rubber suitably prepared for vulcanizing.

2. The herein described process, which consists in subjecting a plurality of strips of flexible material to a suitably prepared rubber solution, heating the same and subjecting the plies to pressure to cause them to adhere to each other, and subjecting the strips to steam for a suitable period of time so that they are semi-cured.

3. The herein described process, which consists in subjecting a plurality of strips of flexible material to a suitably prepared rubber solution, heating the same and subjecting the plies to pressure to cause them to adhere to each other, subjecting the strips to steam for a suitable period of time so that they are semi-cured, and coating the strips with a solution of rubber suitably prepared for quick vulcanizing.

4. The process of manufacturing inner liners for tires, which consists in forming a strip of absorbent flexible material of a suitable width and length, impregnating the same with a rubber solution, forming the said strip to the proper shape for the size of tire with which the liner is to be used, and subjecting the formed strip to a vulcanizing process until the strip is semi-cured.

5. The herein described process of manufacturing inner liners for tires, which consists in preparing strips of absorbent flexible material of proper length and width, impregnating the said strips with a suitably prepared rubber solution, subjecting the strips to pressure whereby they adhere to each other, forming the said strips over a form or in a mold to give the desired shape for the tire with which the liner is to be used, and subjecting the formed strip to a vulcanizing process until the same is semi-cured.

6. The herein described process of manufacturing inner liners for tires, which consists in preparing strips of absorbent flexible material of proper length and width, impregnating the said strips with a suitably prepared rubber solution, subjecting the strips to pressure whereby they adhere to each other, forming the said strips over a form or in a mold to give the desired shape for the tire with which the liner is to be used, subjecting the formed strip to a vulcanizing process until the same is semi-cured, and coating the outer surface of the said liner with a solution of rubber suitably prepared for quick vulcanizing.

7. As a new article of manufacture, an inner liner for tires, comprising a piece of absorbent flexible material impregnated with rubber which is semi-cured.

8. As a new article of manufacture, an inner liner for tires, comprising a piece of absorbent flexible material impregnated with rubber which is semi-cured, the outer surface of the liner being coated with a solution of rubber suitably prepared for vulcanizing.

9. As a new article of manufacture, an inner liner for tires comprising a plurality of superimposed strips of absorbent flexible material impregnated with rubber which is semi-cured.

10. As a new article of manufacture, an inner liner for tires comprising a plurality of superimposed strips of absorbent flexible material impregnated with rubber which is semi-cured, the outer surface of the liner being coated with a solution of rubber suitably prepared for vulcanizing.

11. As a new article of manufacture, an inner liner for tires comprising a plurality of superimposed strips of absorbent flexible material, said strips being cut upon the bias, the whole being impregnated with rubber in a semi-cured condition.

In testimony whereof, I hereunto affix my signature in the presence of two witnesses.

BRENT S. ESHELMAN.

Witnesses:
WILLIAM T. DEVOR,
C. F. BENNER.